United States Patent
Su

(10) Patent No.: US 6,370,023 B1
(45) Date of Patent: Apr. 9, 2002

(54) CASE ASSEMBLY FOR COMPUTER MAINFRAME

(75) Inventor: Bo-Ju Su, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/621,826

(22) Filed: Jul. 21, 2000

(51) Int. Cl.[7] .............................. H05K 7/20; G06F 1/20
(52) U.S. Cl. ...................... 361/687; 361/683; 361/690; 361/695; 312/236; 454/184; 165/80.3
(58) Field of Search ................................ 361/687, 690, 361/692, 695; 454/184; 165/80.3; 312/236

(56) References Cited

U.S. PATENT DOCUMENTS

| | | | | |
|---|---|---|---|---|
| 5,523,917 A | * | 6/1996 | Searby ........................ | 361/687 |
| 5,559,673 A | * | 9/1996 | Gagnon et al. ............. | 361/695 |
| 5,725,622 A | * | 3/1998 | Whitson et al. ............ | 454/184 |
| 5,777,848 A | * | 7/1998 | McAnally et al. .......... | 361/683 |
| 5,790,372 A | * | 8/1998 | Dewey et al. ............... | 361/683 |
| 5,917,698 A | * | 6/1999 | Viallet ......................... | 361/695 |
| 6,094,345 A | * | 7/2000 | Diemunsch .................. | 361/695 |
| 6,130,819 A | * | 10/2000 | Lofland et al. ............. | 361/695 |
| 6,134,107 A | * | 10/2000 | Kerrigan et al. ............ | 361/695 |
| 6,163,453 A | * | 12/2000 | Hou et al. ................... | 361/687 |

* cited by examiner

*Primary Examiner*—Leo P. Picard
*Assistant Examiner*—Lisa Lea-Edmonds
(74) *Attorney, Agent, or Firm*—Bacon & Thomas, PLLC

(57) ABSTRACT

A case assembly for computer mainframe is constructed to include a rectangular hollow shell holding a motherboard, a power supply housing perpendicularly fastened to the rectangular hollow shell at one side of the motherboard and partially protruding over the open side of the rectangular hollow shell, the power supply housing holding an electric fan for dissipation of heat, and a board covered on the open side of the rectangular hollow shell and stopped against the power supply housing, the board having an air conduit adapted for guiding air from the electric fan to air vents on the peripheral wall of the rectangular hollow shell for quick dissipation of heat during the operation of the motherboard.

8 Claims, 3 Drawing Sheets

CASE ASSEMBLY FOR COMPUTER MAINFRAME

BACKGROUND OF THE INVENTION

The present invention relates to a computer mainframe, and more specifically to a case assembly for computer mainframe, which comprises a shell holding a motherboard, a power supply housing mounted in the shell and partially extending out of the shell, and a board covered on the shell and adapted to guide air from an electric fan in the power supply housing to air vents on the peripheral wall of the shell for quick dissipation of heat.

In order to survive in the competitive free market, every computer mainframe case manufacturers have try hard to design humanized computer mainframe cases to attract consumers. However, in order to hold a power supply system in the case of a computer mainframe, the size of the case cannot be reduced to the desired extent. Further, because the CPU of the motherboard of a computer mainframe produces a high temperature during its operation, heat must be quickly carried away so as not to affect normal operation of the CPU and the other electronic component parts of the computer mainframe. Some computer manufacturers may install air conduit means in the computer mainframe to match with electric fans for quick dissipation of heat. The installation of air conduit means according to conventional designs greatly increases the cost and weight of the mainframe case.

SUMMARY OF THE INVENTION

The present invention has been accomplished under the circumstances in view. According to one aspect of the present invention, the case assembly for computer mainframe comprises a rectangular hollow shell holding a motherboard, a power supply housing perpendicularly fastened to the rectangular hollow shell at one side of the motherboard and partially protruding over the open side of the rectangular hollow shell, the power supply housing holding an electric fan for dissipation of heat, and a board covered on the open side of the rectangular hollow shell and stopped against the power supply housing, the board having an air conduit adapted for guiding air from the electric fan to air vents on the peripheral wall of the rectangular hollow shell for quick dissipation of heat during the operation of the motherboard. Because the power supply housing is perpendicularly fastened to the rectangular hollow shell and protruded over the open side of the rectangular hollow shell, the dimension of the rectangular hollow shell can be minimized. According to another aspect of the present invention, an ornamental covering is covered on the board and the protruded part of the power supply housing.

DETAILED DESCRIPTION OF THE PREFERRED EMBODIMENT

Figure 1:
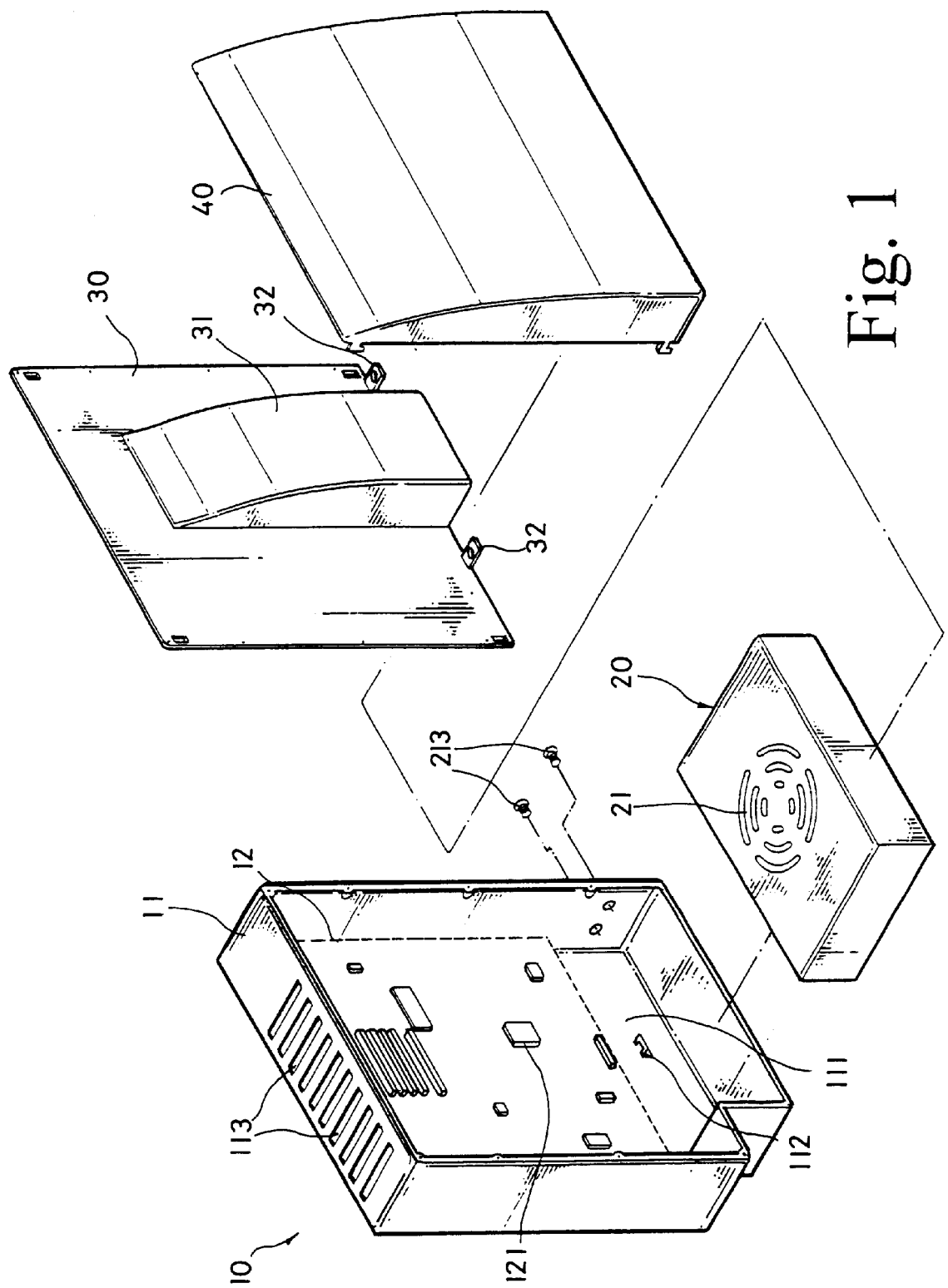
FIG. 1 is an exploded view of a case assembly for computer mainframe according to the present invention.

Referring to FIGS. from 1 through 3, the mainframe 10 comprises a hollow shell 11 of substantially rectangular, U-shaped cross-section. The shell 11 comprises an inside bearing wall 111, a coupling element 112 raised from the inside bearing wall 111, and a plurality of air vents 113 on the perpendicular peripheral wall thereof (see FIG. 1). A motherboard 12 is mounted on the inside bearing wall 111 inside the shell 11 beyond the coupling element 112. The motherboard 12 carries a plurality of electronic component parts 121 to achieve the desired operation.

Figure 2:
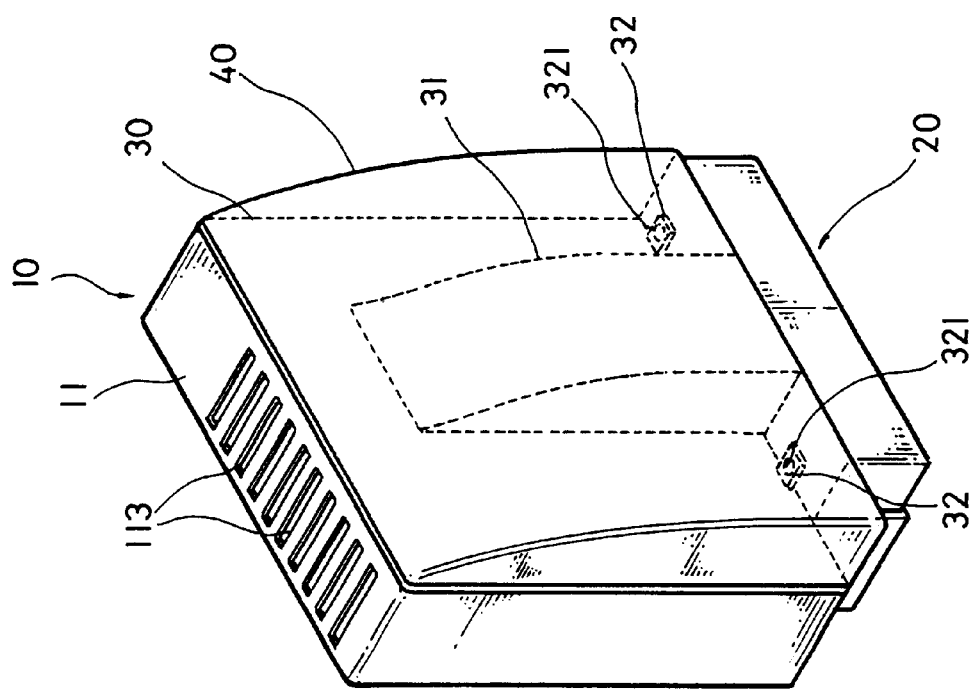
FIG. 2 is a perspective assembly view of the case assembly shown in FIG. 2.
Figure 3:
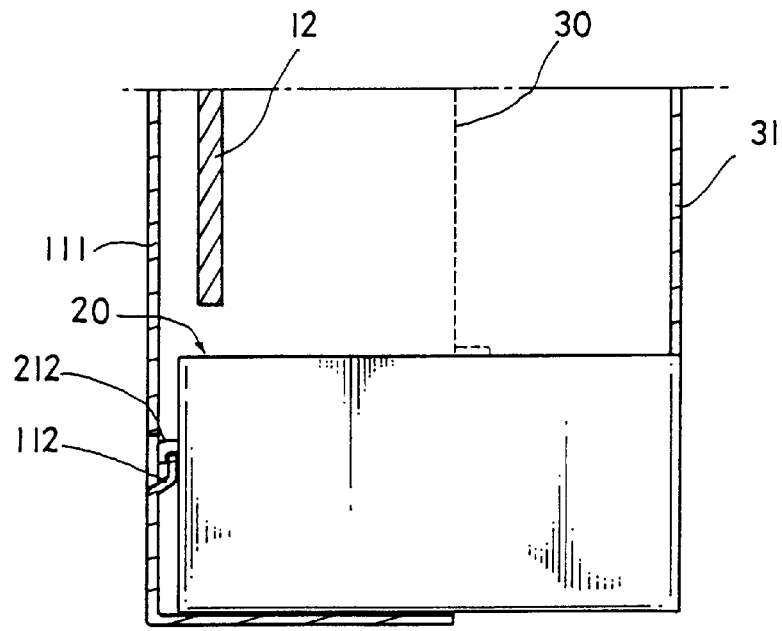
FIG. 3 is a sectional side view of FIG. 2.

A power supply housing 20 is mounted in the shell 11 at one side of the motherboard 12 and partially protruding over the perpendicular peripheral wall of the shell 10 (see FIGS. 2 and 3). The power supply housing 20 is a rectangular shell, comprising a fan 21 on the inside adapted for heat dissipation, and a coupling element 212 raised from the outside wall thereof at one side and adapted and coupled to the coupling element 112 at the inside bearing wall 111 of the shell 11. Further, fastening elements 213 are fastened to the perpendicular peripheral wall of the shell 11 and the power supply housing 20 to fixedly secure the shell 11 and the power supply housing 20 together. After installation, the air output side of the fan 21 is directed toward the air vents 113.

A board 30 is covered on the open side of the shell 11 over the motherboard 12 and perpendicularly stopped at the power supply housing 20, having an arched air conduit 31 adapted to guide air from the fan 21 toward the air vents 113. Further, an ornamental covering 40 is covered on the board 20 and the power supply housing 20 (see FIGS. 1 and 2).

Figure 4:
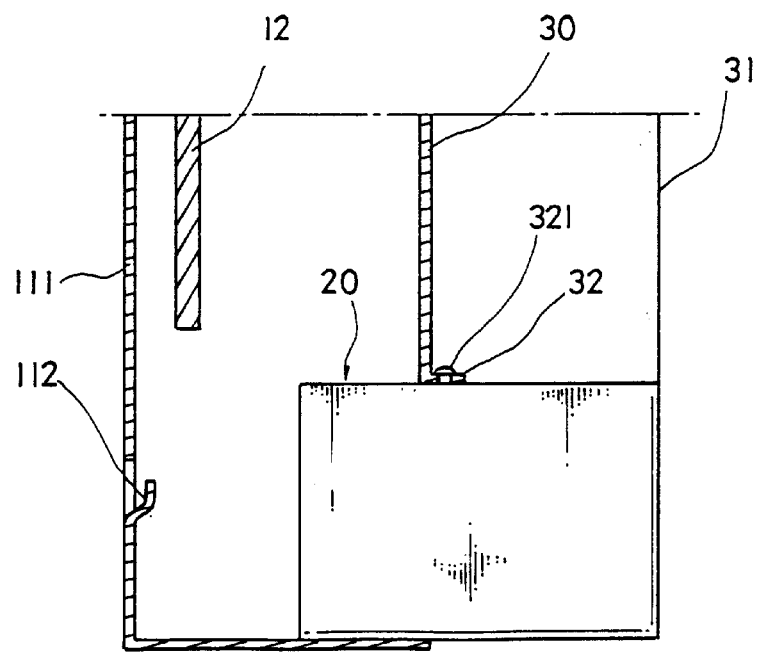
FIG. 4 is a sectional side view of an alternate form of the present invention.

Referring to FIG. 4 and FIG. 1 again, as an alternate form of the present invention, the power supply housing 20 is not coupled to the coupling element 112 of the shell 11, and the board 30 comprises two mounting lugs 32 spaced from two opposite lateral sides of the air conduit 31, and respectively fastened to the top sidewall of the power supply housing 20 by fastening elements 321.

As indicated above, the power supply housing 20 is perpendicularly fastened to the shell 11 and partially protruding over the open side of the shell 11. This design greatly diminishes the dimension of the shell 20. Further, the arrangement of the air conduit 31, the fan 21 and the air vents 113 enable heat to be quickly carried away from the computer mainframe 10 during the operation of the motherboard 12.

It is to be understood that the drawings are designed for purposes of illustration only, and are not intended for use as a definition of the limits and scope of the invention disclosed.

What the invention claimed is:

1. A case assembly for computer mainframe comprising:
    a rectangular hollow shell, said rectangular hollow shell comprising an inside bearing wall holding a motherboard, a peripheral wall perpendicular disposed around said inside bearing wall, and an open side;
    a power supply housing fastened to said rectangular hollow shell and disposed at one side of said motherboard at right angles, said power supply housing having a part protruding over the open side of said rectangular hollow shell and an electric fan mounted therein for dissipation of heat; and a board covered on the open side of said rectangular hollow shell and stopped against a top sidewall of said power supply housing, said board comprising an air conduit adapted for guiding air from said electric fan to the outside of said rectangular hollow shell.

2. The case assembly of claim 1 wherein said rectangular hollow shell comprises a plurality of air vents on the peripheral wall thereof respectively aimed at said air conduit and said electric fan.

3. The case assembly of claim 2 wherein said rectangular hollow shell comprises a coupling element raised from said inside bearing wall, and said power supply housing comprises a coupling element raised from an outside wall thereof and coupled to the coupling element of said rectangular hollow shell.

4. The case assembly of claim 2 further comprising at least one fastening element fastened to the peripheral wall of said rectangular hollow shell and said power supply housing to fixedly secure said rectangular hollow shell and said power supply housing together.

5. The case assembly of claim 3 wherein the coupling element of said rectangular hollow shell is disposed adjacent to one side of said motherboard.

6. The case assembly of claim 1 wherein said board comprises a plurality of mounting lugs spaced from said air conduit at two opposite sides and respectively fastened to a top sidewall of said power supply housing by a respective fastening element.

7. The case assembly of claim 1 further comprising an ornamental covering covered on said board and said power supply housing.

8. The case assembly of claim 6 further comprising an ornamental covering covered on said board and said power supply housing.

* * * * *